United States Patent [19]

Fujita

[11] Patent Number: 5,662,016
[45] Date of Patent: Sep. 2, 1997

[54] PUNCHING DIE

[75] Inventor: Oriya Fujita, Hadano, Japan

[73] Assignee: Amada Metrecs Company, Limited, Kanagawa, Japan

[21] Appl. No.: 715,493

[22] Filed: Sep. 18, 1996

Related U.S. Application Data

[63] Continuation of Ser. No. 220,254, Mar. 30, 1994, abandoned.

[30] Foreign Application Priority Data

Mar. 31, 1993 [JP] Japan ................... 5-073293

[51] Int. Cl.$^6$ ................................................. B26F 1/14
[52] U.S. Cl. ........................ 83/137; 83/138; 83/686; 83/698.91
[58] Field of Search ................... 83/698.91, 686, 83/527, 137, 138, 139, 140

[56] References Cited

U.S. PATENT DOCUMENTS

| Re. 29,950 | 4/1979 | Bartha | 83/698.91 |
|---|---|---|---|
| 1,092,274 | 4/1914 | Lindstedt | 83/140 |
| 2,268,787 | 1/1942 | Wales | 83/140 |
| 2,732,898 | 1/1956 | Taylor . | |
| 2,983,176 | 5/1961 | Taylor | 83/138 |
| 3,101,194 | 8/1963 | Hennells . | |
| 3,114,280 | 12/1963 | Schott | 83/140 |
| 4,248,111 | 2/1981 | Wilson et al. | 83/698.91 |
| 4,292,869 | 10/1981 | Wallis . | |
| 4,316,399 | 2/1982 | Wallis . | |
| 4,440,052 | 4/1984 | Weisbeck | 83/698.91 |
| 5,410,927 | 5/1995 | Omata et al. | 83/139 |

FOREIGN PATENT DOCUMENTS

| 2 038690 | 7/1980 | United Kingdom . |
|---|---|---|
| 2 066412 | 7/1981 | United Kingdom . |

*Primary Examiner*—Kenneth E. Peterson
*Assistant Examiner*—Sean A. Pryor
*Attorney, Agent, or Firm*—Wigman, Cohen, Leitner & Myers

[57] ABSTRACT

A punching die includes a punch body, a punch guide fitted on the punch body movably up and down with respect to the punch body, a punch head provided on a top portion of the punch body, and a gaseous spring provided between the punch body and the punch guide for pushing the punch guide downwardly with respect to the punch body. The gaseous spring is cylindrical and fitted on the punch body detachably, and includes a device for restricting a maximum length of the gaseous spring.

4 Claims, 2 Drawing Sheets

PUNCHING DIE

This is a continuation of application Ser. No. 08/220,254 filed on Mar. 30, 1994, now abandoned.

BACKGROUND OF THE INVENTION

1. Field of the Invention

The present invention relates to a punching die using a gaseous spring.

2. Description of the Related Art

In the conventional punching die, a punch body movable up and down is fitted to a punch guide, and further a spring such as a coil spring, a disk spring, a urethane spring, etc. is interposed between the retainer collar and a punch head fixed to the upper portion of the punch guide.

In the above-mentioned conventional technique, however, when the spring is assembled between the retainer collar and the punch head, there exists a problem in that the spring must be deformed to some extent and a strong force is required to deform the spring for assembly. In addition, when the cutting edge of the punch body is required to be ground again, the retainer collar, the punch head and the spring must be all disassembled. In this disassembly operation, since some parts are tightly assembled or fitted from the standpoint of the punch head structure, it is not easy to disassemble these parts.

Further, after the cutting edge of the punch body has been ground again, the length of the assembled punch body must be adjusted. In this case, since a strong force is required for assembly, there exists a problem in that the adjustment operation is not easy.

SUMMARY OF THE INVENTION

With these problems in mind, therefore, it is the object of the present invention to provide a punching die in which it is easy to assemble the spring, easy to adjust the punch body length after the cutting edge of the punching body has been ground, and easy to manage the cutting edge of the punching body, while keeping the punching die in excellent conditions all the time.

To achieve the above-mentioned object, the present invention provides a punching die. This punching die comprises a punch body, a punch guide fitted on said punch body and movable up and down with respect to said punch body, a punch head provided on a top portion of said punch body, and a gaseous spring provided between said punch body and said punch guide for pushing said punch guide downwardly with respect to said punch body.

In the punching die according to the present invention, the gaseous spring can be easily assembled to the punching die in such a way that the piston is interposed between the cylinder and the cylinder end, and the gas charging chamber is filled with a gas. Further, the punch body is fitted to the piston and the punch head is fixed to the upper portion of the piston.

Accordingly, since the length of the gaseous spring is initially determined when the piston is in contact with the cylinder at an initial stroke end, it is possible to assemble the punch body with the gaseous spring without any adjustment, thus allowing easy assembly after the cutting edge of the punch body has been ground. Since the punch head is fixed to the piston by fastener, the force of the gas spring is not exerted on the punch head, therefore it is easy to fix or detach the punch head.

DETAILED DESCRIPTION OF THE PREFERRED EMBODIMENTS

An embodiment of the punching die according to the present invention will be described hereinbelow with reference to the attached drawings.

Figure 1:
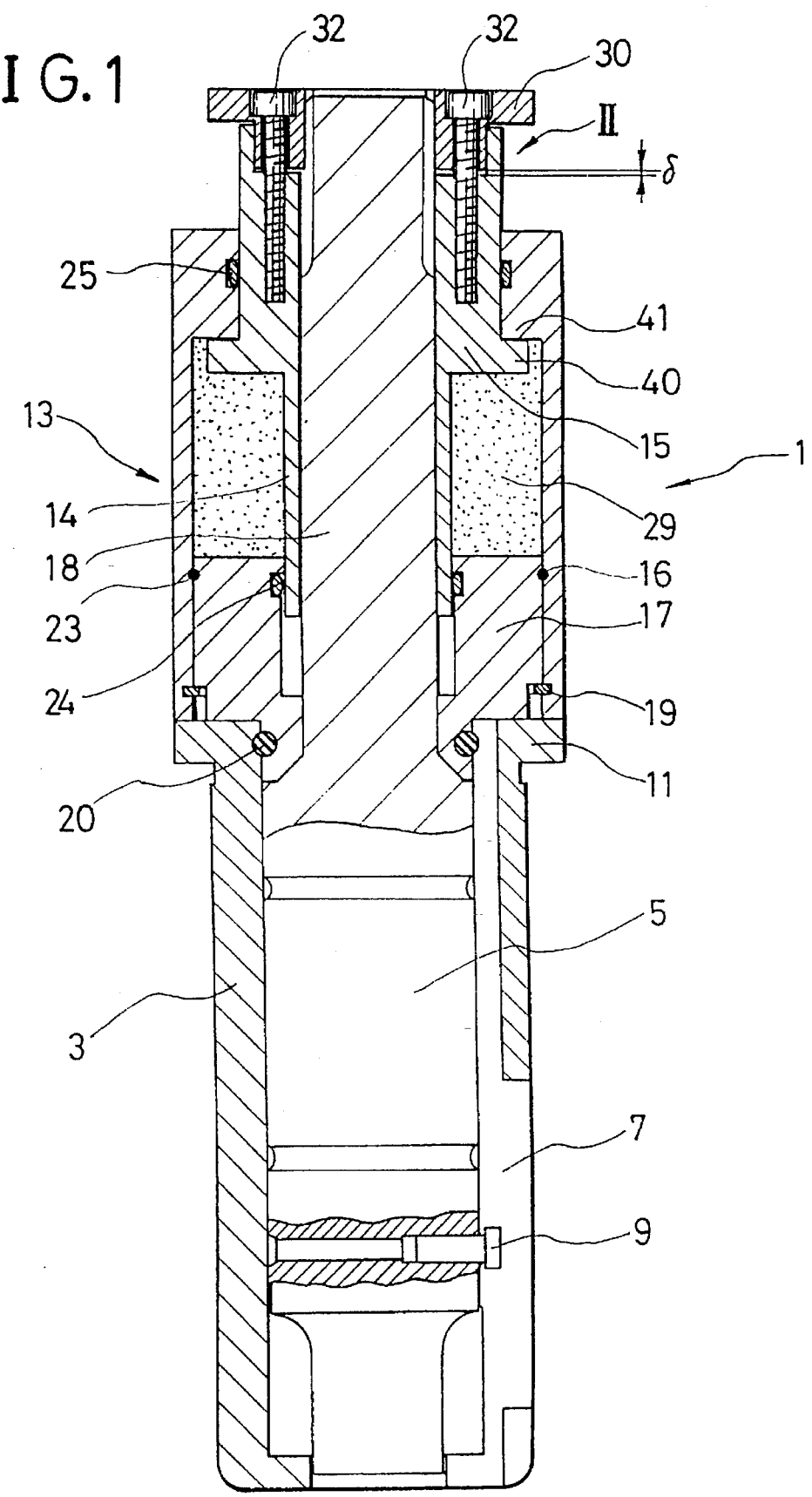
FIG. 1 is a cross-sectional view showing an embodiment of the punching die according to the present invention.

In FIG. 1, a punch guide 3 constituting a part of a punching die 1 is fitted to an upper turret of a turret punch press (not shown), for instance so as to be movable up and down. In this punch guide 3, a punch body 5 extending in the vertical direction is fitted movably in the vertical direction. In addition, the punch guide 3 is formed with a key groove 7 with which a key 9 of the punch body 5 is engaged. Accordingly, since the key 9 can be moved up and down alone the key groove 7, the punch body 5 can also be moved up and down relative to the punch guide 3. In this vertical movement of the punch body 5, rotational motion of the punch body 5 is prevented by the presence of the key 9.

A gaseous spring 13 is mounted on a retainer collar 11 of the punch guide 3. The gaseous spring 13 includes an inner cylinder 14, a piston 15, an outer cylinder 16, and cylinder end 17. The inner cylinder 14 is fitted on an upper portion 18 of the punch body 5. The piston 15 is provided on an upper portion of the inner cylinder 14. The outer cylinder 16 is fitted on the piston 15 movably in upward and downward directions with respect to said piston 15. The cylinder end 17 is provided in a lower portion of said outer cylinder 16. The cylinder end 17 is fixed to the outer cylinder 16 by a ring 19. The cylinder end 17 is fitted on said inner cylinder 14 movably in upward and downward directions with respect to said inner cylinder 14. The cylinder end 17 is fixed to the punch guide 3 by an O-ring 20 which is interposed between a lower portion of the cylinder end 17 and a top portion of the punch guide 3. A gas charging chamber 29 is defined by the inner cylinder 14, said piston 15, said outer cylinder 16, and said cylinder end 17.

Figure 2:
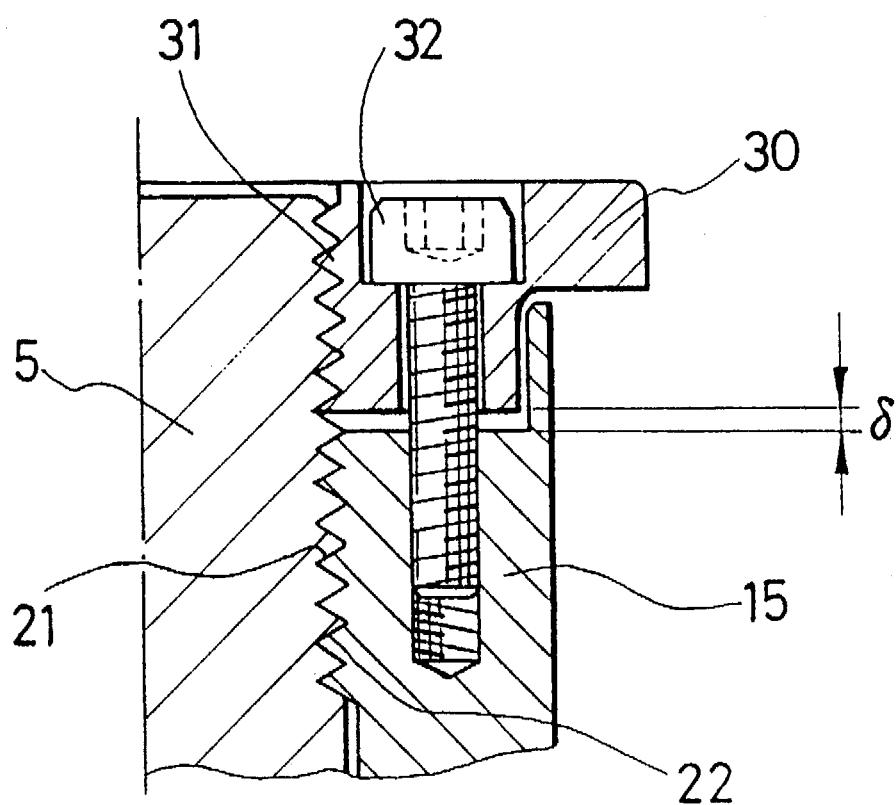
FIG. 2 is an enlarged cross-sectional view showing the portion designated by an arrow II in FIG. 1.

Further, the piston 15 is provided with a female thread 21 on the upper inner circumference thereof, as depicted in FIG. 2. In the same way, a top portion of the punch body 5 is provided with a male thread 22 on an outer circumference thereof. Therefore, the piston 17 can be fixed to the punch body 5 by mesh of the male thread 22 with the female thread 21.

Another O-ring 23 is fitted between the outer cylinder 16 and the cylinder end 17, and a ring 24 is additionally fitted between the inner cylinder 14 and the cylinder end 17 for prevention of gas leakage. In addition, another ring 25 is fitted between the outer cylinder 16 and the piston 15 also for prevention of gas leakage.

A punch head 30 is provided at the top portion of the punch body 5. The punch head 30 is formed with a female thread 31 on the inner circumference thereof, as depicted in FIG. 2. Therefore, the punch head 30 can be fixed to the punch body 5 by mesh of the male thread 22 formed on the upper circumference of the punch body 5 with the female thread 31 formed on the inner circumference of the punch head 30. In addition the punch head 30 is disposed above the piston 15 apart from the piston 15 in a axial direction. A gap δ exists between the punch head 30 and the piston 15. The punch head 30 is fixed to the piston 15 by a plurality of bolts 32. These bolts 32 exert an attractive force on the punch head 30 and the piston 15 therebetween. Therefore the female thread 31 of the punch head 30 and the female thread 21 of the piston 15 are pushed against the male thread 21.

Consequently the punch head 30 and the piston 15 are fixed to the punch body 5 securely.

The lower portion of the piston 15 is provided with a flange 40, and the upper portion of the outer cylinder 16 is provided with a reduced diameter portion 41 extending inwardly from said outer cylinder 16. The flange 40 is engaged with the reduced diameter portion 41, so that the length of the gaseous spring 13 can be determined at the initial stage of the assembly without any adjustment. Therefore it is possible to assemble the gaseous spring 13 to the punch body 5 easily without any adjustment. Further, the punch head 30 is fixed to the piston 15 perfectly by mesh of the male threads 22 and female threads 21, 31, and additionally with the use of the bolts 32 via the gap δ.

Owing to the above-mentioned structure, the gaseous spring 13 can be assembled with the punch body 5 easily and without any adjustment. Further, the punch body 5 can be assembled and adjusted easily with the punch guide 3 after the cutting edge of the punch body 5 has been ground again. Therefore, the cutting edge of the punching body can be managed easily, thereby keeping the punching die in excellent condition all the time.

The present invention can be modified without being limited to only the above-mentioned embodiment.

As described above, in the punching die according to the present invention, the gaseous spring can be easily assembled to the punching die, without any adjustment of the punch body length after the cutting edge of the punching body has been ground. Therefore, the cutting edge of the punching body can be managed easily, so that it is possible to keep the punching die in excellent condition all the time.

What is claimed is:

1. A punching die comprising:

a punch body;

a punch guide fitted on said punch body and movable up and down with respect to said punch body;

a punch head arranged on a top portion of said punch body;

a gaseous spring provided between said punch body and said punch guide for pushing said punch guide downwardly with respect to said punch body, said gaseous spring including:

an inner cylinder fitted on said punch body;

an outer cylinder moving up and down with respect to said inner cylinder, said outer cylinder having a reduced diameter portion extending inwardly; and a piston provided on said inner cylinder, said piston having a flange extending outwardly for engagement with said reduced diameter portion;

wherein said punch body is configured so as to be inserted into said inner cylinder from an underside of said inner cylinder during assembly;

wherein said punch head is screwed on said top portion of said inserted punch body;

wherein said piston is screwed on said top portion of said punch body under said punch head;

wherein said punch head is separate from said gaseous spring in an axial direction; and wherein said punching die further includes means for exerting an attractive force between said punch head and said gaseous spring on said punch head and said gaseous spring.

2. The punching die according to claim 1, wherein said exerting means comprises a bolt.

3. The punching die according to claim 1, wherein said punch body includes exterior threads disposed along a side surface thereof, and said punch head comprises interior threads disposed along a side surface thereof, said exterior threads of said punch body engaging and meshing with said interior threads of said punch head when said punching die is assembled, whereby said punch head is screwed on said top portion of said inserted punch body.

4. The punching die according to claim 1, wherein said punch body includes exterior threads disposed on a side surface thereof, and said piston includes interior threads disposed on a side surface thereof, said exterior threads of said punch body engaging and meshing with said interior threads of said piston when said punching die is assembled, whereby said piston is screwed on said top portion of said punch body under said punch head.

* * * * *